D. M. WINANS.
FASTENER FOR VEHICLE CURTAINS.
APPLICATION FILED DEC. 1, 1917.
1,258,172.
Patented Mar. 5, 1918.
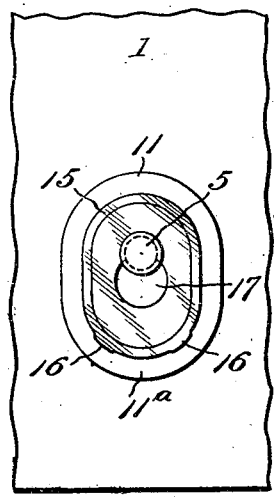
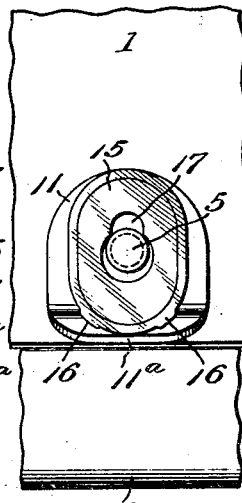
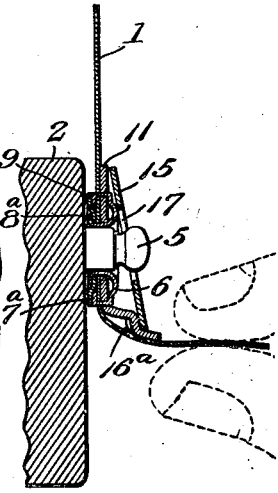
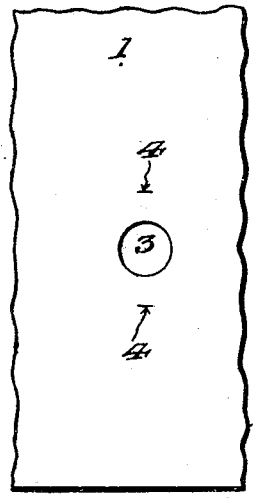
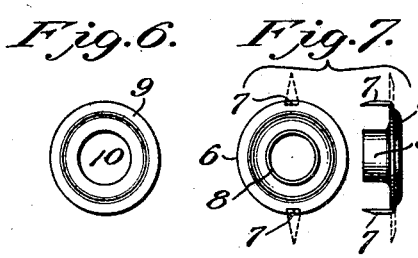
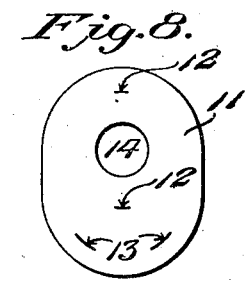
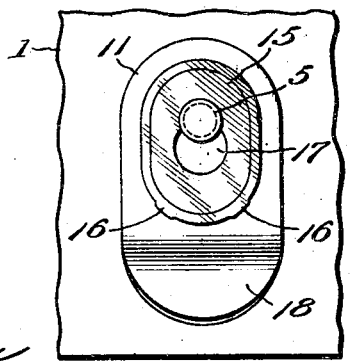
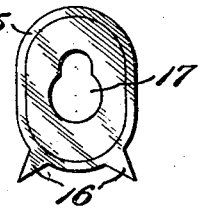
Witness
Edwin F. McKee
Inventor
Daniel M. Winans
By
his Attorney

UNITED STATES PATENT OFFICE.

DANIEL M. WINANS, OF BINGHAMTON, NEW YORK, ASSIGNOR TO THE BREWER-TITCHENER CORPORATION, OF BINGHAMTON, NEW YORK, A CORPORATION OF NEW YORK.

FASTENER FOR VEHICLE-CURTAINS.

1,258,172.

Specification of Letters Patent.

Patented Mar. 5, 1918.

Application filed December 1, 1917. Serial No. 204,944.

*To all whom it may concern:*

Be it known that I, DANIEL M. WINANS, a citizen of the United States, residing at Binghamton, county of Broome, and State of New York, have invented certain new and useful Improvements in Fasteners for Vehicle-Curtains, of which the following is a specification.

The present invention relates to fasteners for the curtains of automobiles and other vehicles, and has for its object the provision of an improved construction comprising few parts arranged and combined in a novel manner, adapting the device to be quickly and easily applied to the curtain and enabling it to be rapidly and easily engaged with the stud or disengaged therefrom.

My present improvements provide a fastener having few parts, inexpensive to manufacture, and enables the fastener to be made small, flat and inconspicuous as well as adapted to be locked by a simple pressing down over the stud, and to be released by a natural and easy lifting movement. The construction prevents the parts from freezing together in cold, rainy or sleety weather.

In the present invention I dispense entirely with locking springs or snap-fastener devices to engage the stud and form all of the metal parts of stampings. No special construction of stud is required, as the fastener is adapted for use in connection with any standard stud.

While those forms of the invention which are described and illustrated employ a patch for carrying the locking plate, the invention is not limited to the use of a patch, as the locking plate may be carried directly by the curtain. Those forms of the invention which are hereinafter described are to be considered as illustrative of the invention, as modifications may be resorted to without departing from the essential principle of the fastener.

In the drawings—

Figure 1 is a front view showing the fastener applied to a portion of a curtain and locked to the stud on the vehicle body;

Fig. 2, a vertical section thereof;

Fig. 3, a view similar to Fig. 1 but showing the curtain partly turned up and the stud entering the larger part of the key-hole slot in the locking plate, preparatory to release of the fastener from the stud;

Fig. 4, a vertical section of the parts when in the position shown in Fig. 3, illustrating the manner of manipulation;

Fig. 5 is a detail of a portion of the vehicle curtain, showing the opening and slots therein;

Figs. 6 and 7, detail views of the washer and gromet, respectively;

Fig. 8, a detail view of the patch;

Fig. 9, a detail of the locking plate with its prongs spread out as it appears before being applied to the patch; and Fig. 10, a view like Fig. 1 showing a modification wherein the patch has a tab.

A portion of a curtain of a vehicle or automobile is shown at 1 and a part of the body at 2. The curtain has an opening 3 and slits 4. The stud 5 on the body 2 may be of any ordinary or standard type and is adapted to pass through the opening 3.

The gromet 6 originally appears in the form shown in Fig. 7, being then provided with the prongs 7 as shown in dotted lines, and a shell 8, the latter being adapted to pass through the opening 3. The prongs 7 are bent down as shown in full lines, Fig. 7, so that they can pass through the slits 4, when the shell 8 is inserted in the opening 3.

The washer 9, Fig. 6, has an opening 10 which receives the shell 8 after the latter has been passed through the opening 3, said shell 8 then being expanded against the washer as shown at 8ª, Fig. 2.

A patch 11, Fig. 8, serves as a reinforcement for the gromet and washer, said patch having slits 12 for the passage of the prongs 7, said slits corresponding with the slits 4. The patch also has slits 13.

Having first applied the patch 11 to the curtain 1, the bent down prongs 7 are passed through the slits 12 and 4, the shell 8 being entered in the opening 14 in the patch and the opening 3 in the curtain. The prongs 7 are clenched against the rear of the curtain, as at 7ª, between the washer 9 and the curtain, as shown in Fig. 2, and the shell 8 is expanded against the washer as at 8ª. The gromet is thereby securely fastened to the curtain, and the shell 8 constitutes an eye adapted to receive the stud 5.

The locking plate 15 is shown in its original form in Fig. 9, it being provided with prongs 16 which are adapted to be bent downward and passed through the slits 13 of the patch 11 and clenched at the rear thereof at 16ª, Fig. 2. The lower portion 11ª of the patch is free and in the nature of a tab; this part constitutes the sole connection between the locking plate 15 and the curtain. Consequently the locking plate may be manipulated as shown in Figs. 3 and 4. A key-hole slot 17 in the locking plate 15 is so formed and dimensioned that by manipulating the curtain, or the patch, the larger portion of said slot may be brought into alinement with the stud 5 to accomplish locking or release, of the fastener. The normal position of the locking plate is that shown in Fig. 2, where the smaller part of the slot 17 is in line with the neck of the stud. The arrangement of the locking plate is such that it tends to assume locking position; consequently the locking plate remains in the position shown in Fig. 2 when the fastener has been passed over the stud and will not become accidentally disengaged, but requires positive manipulation, as shown in Figs. 3 and 4, to elevate the locking plate so that the larger part of the slot 17 will come in line with the head of the stud when the curtain is to be released.

In Fig. 10 the construction is identical with that heretofore described, but the patch 11 is extended considerably below the locking plate to form a relatively large tab 18 which can be directly grasped by the fingers to lock or release the fastener, whereas in the construction shown in the other figures, the curtain is grasped to lock or release the fastener, as shown in Fig. 4.

It is within the spirit of my invention to attach the locking plate 15 directly to the curtain 1, instead of to the patch 11.

What is claimed is:

1. A fastener for the curtain of an automobile or other vehicle comprising a gromet carried by the curtain, and a locking plate having a stud-receiving opening, said locking plate being attached at one portion to the curtain and having a free portion whereby it may be shifted in relation to the curtain to accomplish locking, or release, of the curtain from the stud.

2. A fastener for the curtain of an automobile or other vehicle comprising a gromet carried by the curtain through which the stud may pass, and a locking plate having a stud-receiving slot, said locking plate being connected to the curtain at only a certain portion of said plate and otherwise free of the curtain and adapted to slide crosswise in relation to the gromet, whereby manipulation of the locking plate will adapt it to be locked to, or released from, the stud.

3. A fastener for the curtain of an automobile or other vehicle comprising a patch having a free portion, a gromet, and a locking plate having a stud-receiving opening, said plate being attached at one portion to the patch and carried by the latter and having its remaining portion free so that it may be shifted in relation to the gromet to accomplish locking to, or release from, the stud by shifting the patch.

4. A fastener for the curtain of an automobile or other vehicle comprising a patch having a free portion, a gromet secured to the patch and curtain, and a locking plate having a stud-receiving opening, said plate being connected to the free portion of the patch and disposed in front of the gromet and free to slide in relation to the latter when the free portion of the patch is raised or lowered, whereby the plate is secured to, or released from, the stud.

In testimony whereof, I hereunto affix my signature.

DANIEL M. WINANS.

Copies of this patent may be obtained for five cents each, by addressing the "Commissioner of Patents, Washington, D. C."